United States Patent

[11] 3,550,872

[72] Inventor Erik A. Porterfield
Armonk, N.Y.

[21] Appl. No. 718,854
[22] Filed Apr. 4, 1968
[45] Patented Dec. 29, 1970

[73] Assignee Columbia Broadcasting System, Inc.
New York, N.Y.
a corporation of New York

[54] HUB FOR ENDLESS MAGNETIC TAPE CARTRIDGE

3 Claims, 6 Drawing Figs.

[52] U.S. Cl. 242/55.19, 242/71.8
[51] Int. Cl. B65h 17/48, B65h 75/18
[50] Field of Search 242/55.19A, 55.19, 55.18, 55.21, 71.8, 71.8A, 68.2, 118.2

[56] References Cited

UNITED STATES PATENTS

| | | | |
|---|---|---|---|
| 3,468,490 | 9/1969 | Knox | 242/55.19 |
| 1,462,401 | 7/1923 | Way | 242/55.18X |
| 3,310,252 | 3/1967 | Ewing | 242/68.2 |
| 3,350,028 | 10/1967 | Lear | 242/71.8 |
| 3,388,873 | 6/1968 | Rosenbaum | 242/55.21 |

*Primary Examiner*—Billy S. Taylor
*Attorney*—Brumbaugh, Graves, Donohue & Raymond

ABSTRACT: An endless magnetic tape cartridge has a rotatable reel with a hub compressible and expandable in accordance with the pressure in the coil of tape wound thereabout to preclude binding of the tape as it unwinds from the center of the coil. The compressibility of the hub is provided by one of the following: (1) a composite hub having a ringlike sponge between segments arranged circumferentially around the periphery of a central web portion; (2) a unitary hub having a series of circumferential slots terminating in enlarged apertures to define thin yieldable segments, and (3) a composite hub having peripheral sections attached to arcuate spring means.

PATENTED DEC 29 1970

3,550,872

INVENTOR.
ERIK A. PORTERFIELD

BY
Brumbaugh, Free, Graves & Donohue his ATTORNEYS

HUB FOR ENDLESS MAGNETIC TAPE CARTRIDGE

BACKGROUND OF THE INVENTION

This invention relates to magnetic tape cartridges and, more particularly, to a new and improved endless magnetic tape cartridge which is characterized by the withdrawal of the innermost layer of tape from a spool and the subsequent guiding of the tape to the outermost layer of the spool.

In general, an endless magnetic tape cartridge comprises an endless strip of magnetic tape spirally wound on a frustoconically shaped rigid hub which guides the magnetic tape from its innermost layer or convolution to its outermost layer. One surface of the magnetic tape is ordinarily lubricated with a coating, such as graphite, which reduces friction and permits sliding between adjacent layers of the tape. To further reduce the friction between adjacent layers, the tape is initially wound loosely around the rigid hub.

A common difficulty with such endless magnetic tape cartridges has been their unreliability and relatively short life spans caused by the tape binding due to increased friction between adjacent layers of the tape during operation. Should the magnetic tape bind, the cartridge is rendered inoperative and because of the extreme difficulty in repairing such cartridges, the cartridges quite often must be discarded and replaced by a new cartridge.

A factor contributing to the above difficulty which has heretofore not been recognized in the design and construction of such endless magnetic tape cartridges is the expansion by the hub, ordinarily formed of plastic, and the magnetic tape when the ambient temperature increases. For example, the diameter of a conventional plastic hub may expand about 0.006 inch at a temperature of 150° F. or approximately the thickness of three layers of tape. Notwithstanding the expansion of the magnetic tape, the expansion by the hub is sufficient to cause an increase in the friction between adjacent layers of tape and the attendant binding and improper motion.

SUMMARY OF THE INVENTION

Accordingly, it is an object of the present invention to provide an improved and reliable endless magnetic tape cartridge which overcomes the above-mentioned disadvantages of the prior art.

It is another object of the present invention to provide an endless magnetic tape cartridge of the above type wherein the hub about which the magnetic tape is wound is constructed to compensate for expansion and contraction of the tape and the hub during the operation of the cartridge.

These and other objects of the present invention are accomplished in accordance with the present invention by the provision of an endless magnetic tape cartridge which comprises a compressible hub about which the spool of magnetic tape is wound. The hub precludes the binding and improper motion of the tape due to increased friction between adjacent layers of the tape by flexing inwardly as the tape tightens and alternately compensates against excessive looseness in the tape by exerting an outward radial force against the magnetic tape.

In one embodiment of the invention, a hub for an endless magnetic tape cartridge comprises a slotted peripheral flange having a V-shaped groove formed therein for receiving a spool of magnetic tape, a central web member and a ringlike member received in corresponding openings formed in the peripheral flange and the central web member. In a second embodiment of the invention a hub is provided which includes a slotted peripheral flange and a central web member, the web member having formed therein spaced apertures and arcuate slots terminated on opposite ends by the apertures and the slots formed in the peripheral flange. In a third embodiment of the invention, a hub is provided with a slotted peripheral flange and a central web member, the web member having formed therein a pair of semicircular slots and terminated on opposite sides by slots formed in the peripheral flange.

DESCRIPTION OF THE PREFERRED EMBODIMENT

Figure 1:
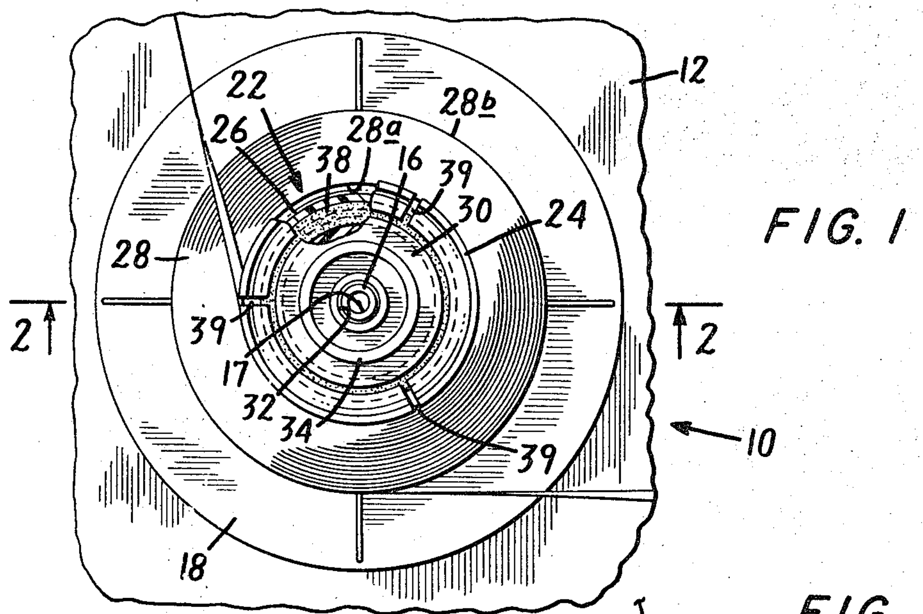
FIG. 1 is a fragmentary plan view of an endless magnetic tape cartridge including one embodiment of a representative compressible hub member according to the present invention.
Figure 2:
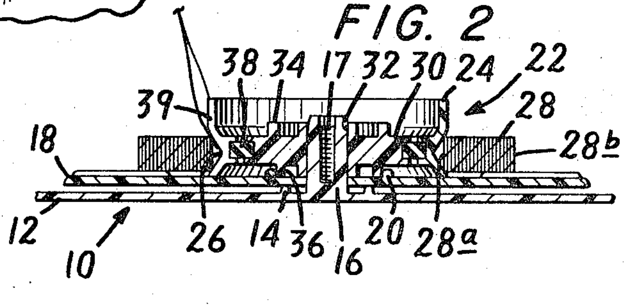
FIG. 2 is a sectional view of the cartridge taken along line 2–2 of FIG. 1 and looking in the direction of the arrows.

In the illustrative embodiment of an endless magnetic tape cartridge according to the invention, as shown in FIGS. 1 and 2, the cartridge comprises a housing 10 formed of a suitable material which may be, for example, plastic. The housing 10 includes a bottom wall 12 which comprises a generally circular upright flange support member 14. Also formed in the bottom wall 12 and situated centrally of the flange support member 14 is a cartridge hub member 16 which has a generally cylindrical configuration. The hub member has formed therein an internally threaded opening 17 adapted to receive a lock screw (not shown) which clamps the top wall of the cartridge (not shown) to the bottom wall 12 in accordance with conventional practice. A circular support plate 18 having a central bore formed therein is mounted around the hub member 16 and is supported above the bottom wall 12 by the flange member 14. Also formed in the support plate 18 and radially spaced from the bore formed in the plate 18 is a circular upright flange 20.

In accordance with the present invention, a generally cylindrically-shaped compressible hub member 22 is mounted around the hub member 16 above the support plate 18. The hub member 22 comprises a peripheral plastic flange 24 having formed therein adjacent the support plate 18 a generally V-shaped groove 26 about which a spool of magnetic tape 28 is spirally wound. The magnetic tape 28 comprises an innermost layer 28*a* which is withdrawn from the hub 22 by suitable means and an outermost layer 28*b* which is taken up by the hub 22. The tape 28 is supported by and in frictional engagement with the circular support plate 18.

As is understood in the art, the groove 26 is provided to facilitate the withdrawal of the innermost layer of magnetic tape 28*a* from the hub 22 and, at the same time, provide for improved frictional engagement therebetween. Preferably, the tape 28 is lubricated on one surface with a coating, such as, for example, graphite, which reduces friction and facilitates sliding between adjacent layers of the tape. The tape 28 is directed by guide pins (not shown) formed in the cartridge and preferably driven at a constant speed by a capstan engaged by a pressure roller (not shown) so that a substantially constant pressure is maintained on the tape 28 as it leaves the innermost layer 28*a*. Such guide pins and drive means are conventional and, accordingly, need not be illustrated or described in detail herein.

The hub member 22 further comprises a disclike central web member 30 located centrally of the peripheral flange 24. The web member 30 has formed therein a central aperture 32 which receives the hub member 16 and upper and lower circular flange members 34 and 36. The flange member 36 engages the circular support plate 18 and is retained within the area defined by the flange 20.

Mounted within corresponding openings formed the peripheral flange radially inwardly of the groove 26 and the web member 30 is a ringlike member 38 formed of a suitable flexible material, such as, for example, sponge rubber. The ringlike member 38 is attached to both the flange 24 and the web 34 by a suitable adhesive so as to join the two members together as an integral hub member and imparts a flexibility or compressibility to the hub. To further increase the compressibility of the hub member 22, the peripheral flange 24 has formed therein spaced slots 39. Preferably, the slots 39 are formed at 120° spacings around the periphery.

In the operation of the cartridge 10, the lubricated magnetic tape 28 is wound loosely around the hub member 22 above the circular support plate 18. Because of the resilience of the hub member 22, the hub compensates against excessive looseness between adjacent layers of the magnetic tape by exerting an outward radial force against the magnetic tape. When the magnetic tape is driven at a constant speed and guided from its innermost convolution 28*a* to its outermost convolution 28*b* by suitably positioned guide pins (not shown), the friction between the hub member 22, the magnetic tape 28, the circular support member 18 and the adjacent layers of the magnetic tape causes the hub member 22 and the circular support plate 18 to rotate at a constant angular velocity. With continued operation of the cartridge, the magnetic tape ordinarily tends to tighten around the hub member 22 to cause the binding of the tape. This tendency is maximized where a high ambient temperature causes the hub member 22 and the magnetic tape 28 to expand. However, the hub member 22 compensates against the tendency of the tape to tighten around the hub by compressing inwardly. Accordingly, the hub member 22 tends to maintain a uniform frictional relationship between adjacent layers of the magnetic tape such that the magnetic tape will not bind, even after continuous use of the cartridge.

Figure 3:
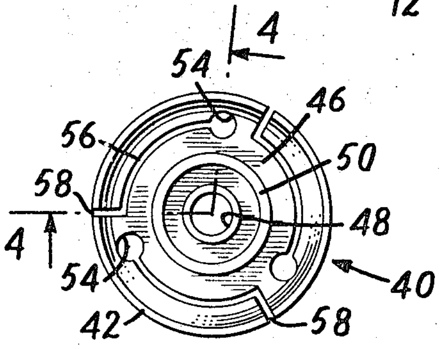
FIG. 3 is a plan view of another embodiment of a representative compressible hub member according to the present invention.
Figure 4:
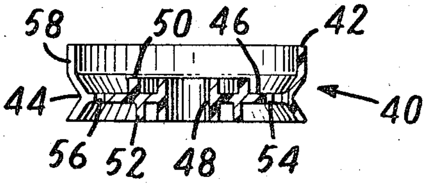
FIG. 4 is a sectional view of the hub member taken along line 4–4 of FIG. 3 and locking in the direction of the arrows.

In another embodiment of a compressible hub member for endless magnetic tape cartridges according to the present invention, as shown in FIGS. 3 and 4, there is provided a generally cylindrically-shaped compressible hub member 40, preferably formed of plastic. The hub member 40 comprises a peripheral flange 42 having formed therein a generally V-shaped groove 44 for frictionally engaging the innermost layer of a spool of magnetic tape. Located centrally of the peripheral flange 42 is a disclike central web member 46. The web member 46 has formed therein a central aperture 48 adapted to receive the hub of a cartridge and upper and lower circular flange members 50 and 52 spaced radially from the aperture 48.

Formed in the web member 46 between the flange members 50 and 52 and the peripheral flange 42 are spaced apertures 54. The apertures 54 are preferably formed at 120° spacings in the web 46. The web member 46 further comprises arcuate slots 56 terminated on opposite ends by the apertures 54 and by a plurality of radial slots 58 formed in the peripheral flange 42. Because of the configuration of the hub member 40, the hub compensates against the tendency of magnetic tape wound around the peripheral flange 42 to tighten after continuous use of use in high ambient temperatures by compressing inwardly. Conversely, the hub member 40 will exert an outward radial force against a spool of magnetic tape should the tape be wound too loosely around the flange 42. Hence, a uniform frictional relationship will exist between adjacent layers of a magnetic tape wound around the hub member 40.

Figure 5:
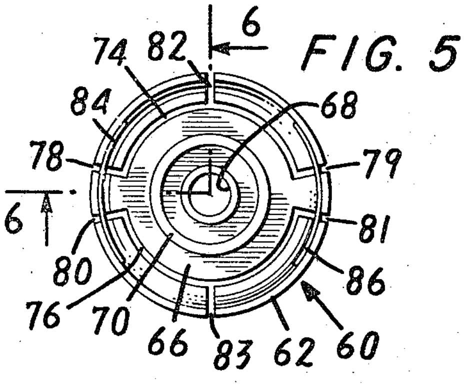
FIG. 5 is a plan view of still another embodiment of a representative compressible hub member according to the present invention.
Figure 6:
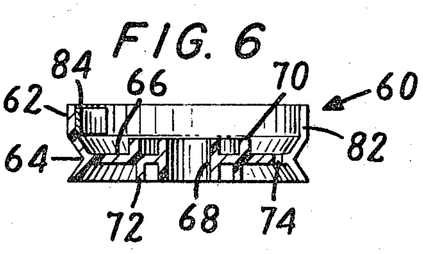
FIG. 6 is a sectional view of the compressible hub member taken along line 6–6 of FIG. 5 and looking in the direction of the arrows.

In still another embodiment of a hub member for endless magnetic tape cartridge arranged according to the present invention, as shown in FIGS. 5 and 6, there is provided a generally cylindrically-shaped compressible plastic hub member 60. The hub member comprises a peripheral flange 62 having formed therein a V-shaped groove 64 for receiving the innermost layer of a spool of magnetic tape. A central web member 66 is located centrally of the flange 62 and comprises a central bore 68 adapted to receive the hub of a cartridge. Further formed in the web member 66 are upper and lower flange members 70 and 72 spaced radially from the central bore 68.

To impart compressibility to the hub member 60, the web member 66 has formed therein a pair of semicircular slots 74 and 76. The slots are terminated on opposite ends by slots 78, 79 and 80, 81, respectively, formed in the peripheral flange 62. A pair of slots 82 and 83, respectively, similarly formed in the flange 62 intersect the semicircular slots 74 and 76. Because the portions of the peripheral flange 62 bounded by the slots 78, 82 and 79 and 80, 83 and 81 are detached, a pair of metal springs 84 and 86 are cemented to the inner surface of the peripheral flange 62. The spring 84 extends across the slots 78 and 80 and the spring 86 extends across the slots 79 and 81.

Because of the slotted configuration of the hub member 60, the hub member will exert an outward radial force against a spool of magnetic tape should the tape be wound loosely around the peripheral flange 62. Should the tape tend to bind due to an increase in the ambient temperature or due to continuous playing, the hub member 60 will compress inwardly to assure a uniform frictional relationship between adjacent layers of the tape.

Although the invention has been described herein with reference to a specific embodiment many modifications and variations therein will readily occur to those skilled in the art. Accordingly, all such variations and modifications are included within the intended scope of the invention as defined by the following claims.

I claim:

1. In an endless magnetic tape cartridge having a hub member and a rotatably mounted support member adapted to carry a reel of tape, the improvement comprising a hub resiliently compressible radially in response to the tightness of the tape wrap therearound, said hub being of unitary construction and having a central web with a central bore formed therein for receiving the hub member of the cartridge and a peripheral flange with a V-shaped groove for frictionally engaging the innermost layer of the reel of tape and slotted to impart said resilient compressibility of the hub.

2. The endless magnetic tape cartridge according to claim 1 wherein the central web has formed therein spaced apertures and spaced arcuate slots, the arcuate slots terminated on opposite ends by the apertures and the slots formed in the slotted peripheral flange.

3. The endless magnetic tape cartridge according to claim 1 wherein the central web has formed therein a pair of semicircular slots terminated on opposite ends by the slots formed in the slotted peripheral flange and intersected by the slots formed in the slotted peripheral flange and further comprising a pair of spring members secured to the peripheral flange and extending across the slots terminating the semicircular slots formed in the central web.